Patented Jan. 7, 1930

1,743,004

UNITED STATES PATENT OFFICE

SWIGEL POSTERNAK AND THEODOR POSTERNAK, OF CHENE-BOUGERIES, NEAR GENEVA, SWITZERLAND, ASSIGNORS TO SOCIETY OF CHEMICAL INDUSTRY IN BASLE, OF BASEL, SWITZERLAND

IRON COMPOUND FROM ANIMAL PROTEIDS AND PROCESS OF MANUFACTURE THEREOF

No Drawing. Application filed January 4, 1928, Serial No. 244,549, and in Switzerland January 17, 1927.

The present invention relates to new iron compounds of the phosphorus nuclei obtained from the proteids of egg yolk, said compounds being useful in therapeutics, for instance as tonics, and it comprises the new compounds themselves as well as the process of their manufacture.

In the co-pending application Serial No. 177,220, a process is described according to which, by subjecting egg yolk in succession to a peptic and a tryptic digestion, mixtures of the phosphorus nuclei of the proteids contained in egg yolk are obtained which may be isolated in the free form or as salts.

In the further co-pending specification Serial No. 177,222, a process for separating at least one of the three phosphorus nuclei of said proteids is described, which process is based on the different solubilities of the single phosphorus nuclei in solvents, such as water and alcohol.

As described in the latter specification, the phosphorus nucleus $\beta$ has been found to be the iron carrier of the egg yolk. The closer study of the two phosphorus nuclei $\alpha$ and $\beta$ has shown, that they are very similar to each other and differ only by the iron content of the latter. Both compounds possess, except for the iron content, the same chemical composition, yield by hydrolysis the same amino acids, principally serine, and contain the same number of phosphoric acid radicals, which are esterified with the hydroxyl groups of serine, two phosphoric acid radicals being present in the free form. Both compounds are thus polybasic acids which are actually capable of binding two equivalents of light metals for each phosphoric acid radical, as for instance alkaline or alkaline earth bases. According to this fact it seems that the iron is not bound in the salt form in the phosphorus nucleus $\beta$.

It has now been found, that the phosphorus nucleus $\alpha$ behaves differently towards alkalies and alkaline earths than towards iron, i. e. it binds not only two equivalents for each phosphoric acid radical, as it was to be expected, but somewhat more than 3 equivalents of iron, whereby those valences are first saturated which have nothing to do with the acid capacity of the compound, as shown by the fact that, if the phosphorus nucleus $\alpha$ is precipitated with about 1.2 equivalents of iron or less, the iron is bound organically, the free phosphoric acid hydroxyl groups remaining intact and being capable of partial or total saturation by metals, as for instance alkali metals or alkaline earth metals.

The iron compound of the phosphorus nucleus $\alpha$ thus obtained is very similar to the phosphorus nucleus $\beta$ and differs from the latter only by its diminished stability towards caustic alkalies. It contains about 5 per cent of iron.

Both the nuclei $\alpha$ and $\beta$ are capable to bind more iron, thus yielding genuine iron salts of saturated or acid character.

The acid, i. e. unsaturated, iron salts are formed in presence of an excess of a soluble iron compound in strongly acid solution, the saturated salts by treating a neutral solution of the phosphorus nuclei with an excess of a soluble iron compound.

The acid salts are whitish-yellow and contain about 14.5 per cent of iron and 10.5 per cent of phosphorus.

The saturated salts are reddish-yellow and contain about 18.0 per cent of iron and 9.5 per cent of phosphorus.

The iron compounds containing only organically bound iron as well as the acid iron salts are capable to react with soluble compounds of light metals of the first and second series of the periodic system, for instance with alkali or alkaline earth metal compounds, thus yielding mixed compounds of the phosphorus nuclei with said metals and iron, which may be separated out by precipitation with alcohol.

Instead of the isolated phosphorus nuclei also a mixture of them or a raw digestion mixture obtained by successive peptic and tryptic digestion of egg yolk according to the copending application Serial No. 177,220 or No. 177,222 may be employed as starting material for the preparation of the above named new iron compounds.

The invention is illustrated by the following examples:—

Example 1

1 kilogram of phosphorus nucleus $\alpha$ is dissolved in weak soda solution or in very dilute amonia, the solution acidulated with acetic acid, and 200 grams of crystallized iron chloride in aqueous solution added thereto. The mixture is precipitated with concentrated hydrochloric acid, the precipitated filtered, washed and dried. The iron compound thus obtained contains more than 5 per cent of organically bound iron.

For preparing the alkali metal salts of this iron compound the same is dissolved in water made alkaline with soda and precipitated with alcohol. After drying the precipitate a yellowish powder is obtained, which is soluble in water and contains about 4.5 per cent of iron and about 10.5 per cent of sodium.

In order to obtain the alkaline earth metal salts of the iron compound described in paragraph 1 the latter is dissolved in a small excess of ammonia, the solution precipitated with a solution of calcium chloride, the precipitate filtered, thoroughly washed with water, dried and pulverized. The iron calcium compound thus obtained forms a white powder, containing 4.5 per cent of iron and about 10 per cent of calcium, and being insoluble in water.

Example 2

1 kilogram of a raw mixture of the phosphorus nuclei $\alpha$, $\beta$ and $\gamma$ is dissolved in weak soda solution and the solution acidulated with acetic acid, and a solution of 500 grams of crystallized iron chloride added thereto. The mixture obtained is precipitated with an excess of concentrated hydrochloric acid, filtered and thoroughly washed with water. The dried salt contains about 14.5 per cent of iron, whereof about one half is organically bound.

Example 3

1 kilogram of phosphorus nucleus $\alpha$ or of a mixture of the phosphorus nuclei $\alpha$ and $\beta$ are dissolved in weak soda solution or in very dilute ammonia, then 520 grams of crystallized iron chloride added thereto and the well stirred mixture treated with an excess of concentrated hydrochloric acid. The precipitate is filtered, thoroughly washed with water and dried. The yellowish white compound thus obtained contains about 14.5 per cent of iron, whereof somewhat more than one half is organically bound.

Example 4

10 kilogram of defatted egg yolk are subjected first to a peptic digestion in a mineral acid medium. The action of pepsin is arrested at a desired stage by total or partial neutralization, the digestion mixture is filtered and the precipitate subjected to a second digestion with trypsin in a weak alkaline solution. The tryptic digestion liquid thus obtained is exactly neutralized with hydrochloric acid and a solution of 350 grams of crystallized iron chloride added thereto. The precipitate is filtered, thoroughly washed with water, and dried. The salt thus obtained form a reddish-yellow powder and containing about 18.0 per cent of iron.

Example 5

1 kilogram of a mixture of the phosphorus nuclei $\alpha$ and $\beta$ is dissolved as described in the foregoing examples, then exactly neutralized with acetic acid and precipitated with 750 grams of iron chloride. The precipitate is washed, dried, and pulverized. The reddish-yellow powder thus obtained contains about 18.0 per cent of iron.

It is obvious that in the above mentioned examples instead of hydrochloric acid other mineral acids, as for instance nitric acid, may be employed for digesting the proteids or for precipitating the iron compounds.

What we claim is:—

1. Process for obtaining iron compounds of the phosphorus nuclei of the proteids contained in egg yolk, by adding a soluble iron compound to a solution containing at least the first of the three phosphorus nuclei $\alpha$, $\beta$ and $\gamma$; under non-alkaline conditions.

2. Process for obtaining iron compounds of the phosphorus nuclei of the proteids contained in egg yolk, by adding a soluble iron compound to a solution containing at least the first of the three phosphorus nuclei $\alpha$, $\beta$ and $\gamma$; in presence of an excess of a mineral acid.

3. Process for obtaining iron compounds of the phosphorus nuclei of the proteids contained in egg yolk, by adding a soluble iron compound to a solution containing at least the first of the three phosphorus nuclei $\alpha$, $\beta$ and $\gamma$; in presence of an excess of a mineral acid, the quantity of the iron compound being insufficient to saturate the free hydroxyl groups of the phosphorus nuclei.

4. Process for obtaining iron compounds of the phosphorus nuclei of the proteids contained in egg yolk, by adding a soluble iron compound to a solution containing at least the first of the three phosphorus nuclei $\alpha$, $\beta$ and $\gamma$; in presence of an excess of a mineral acid, the quantity of the iron compound being insufficient to saturate the free hydroxyl groups of the phosphorus nuclei, dissolving the precipitate formed and treating with alcohol in presence of a solution of a compound of a light metal belonging to one of the two first groups of the periodic system.

5. Process for obtaining iron compounds of the phosphorus nuclei of the proteids contained in egg yolk, by adding a soluble iron compound to a solution containing at least the first of the three phosphorus nuclei $\alpha$, $\beta$ and $\gamma$; in presence of an excess of a mineral acid, the quantity of the iron compound being insufficient to saturate the free hydroxyl groups of the phosphorus nuclei, dissolving the precipitate formed in a solution of an alkali-compound, and precipitating the solution thus obtained with alcohol.

6. As new products useful in therapeutics iron compounds of the phosphorus nuclei of the proteids contained in egg yolk, said compounds containing the iron at least partly in organic binding and being soluble in soda.

7. As new products useful in therapeutics iron compounds of the phosphorus nuclei of the proteids contained in egg yolk, said compounds containing from about 5 per cent to about 18 per cent of iron, the latter being at least partly present in organic binding, said products being soluble in soda.

8. As new products useful in therapeutics iron compounds of the phosphorus nuclei of the proteids contained in egg yolk, said compounds containing about 5 per cent of iron in organic binding, said products being soluble in soda.

9. As new products useful in therapeutics iron compounds of the phospohrus nuclei of the proteids contained in egg yolk, said compounds containing iron and a light metal of one of the first two groups of the periodic system.

10. As new products useful in therapeutics iron compounds of the phosphorus nuclei of the proteids contained in egg yolk, said compounds containing iron and an alkali metal, the iron being present in organic binding, said products being soluble in soda.

In witness whereof we have hereunto signed our names this 21st day of December, 1927.

SWIGEL POSTERNAK.
THEODOR POSTERNAK.